US011853209B2

(12) United States Patent
Reed et al.

(10) Patent No.: US 11,853,209 B2
(45) Date of Patent: Dec. 26, 2023

(54) SHARED MEMORY WORKLOADS USING EXISTING NETWORK FABRICS (71) Applicant: LENOVO ENTERPRISE SOLUTIONS (SINGAPORE) PTE. LTD., Singapore (SG)

(72) Inventors: Connor B. Reed, Durham, NC (US); Jeffrey R. Hamilton, Pittsboro, NC (US); Clifton E. Kerr, Morrisville, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 469 days.

(21) Appl. No.: 16/916,546

(22) Filed: Jun. 30, 2020

(65) Prior Publication Data
US 2021/0406175 A1    Dec. 30, 2021

(51) Int. Cl.
*G06F 12/06* (2006.01)
*G06F 12/02* (2006.01)
*G06F 9/48* (2006.01)
*G06F 13/42* (2006.01)
*G06F 12/1081* (2016.01)

(52) U.S. Cl.
CPC .......... *G06F 12/063* (2013.01); *G06F 9/4812* (2013.01); *G06F 12/0292* (2013.01); *G06F 12/1081* (2013.01); *G06F 13/4221* (2013.01); *G06F 2213/0026* (2013.01)

(58) Field of Classification Search
CPC .................................................... G06G 12/063
USPC ........................................................ 711/154
See application file for complete search history.

(56) References Cited

U.S. PATENT DOCUMENTS

| 6,295,584 | B1* | 9/2001 | DeSota | G06F 12/0284 711/147 |
| 2003/0005070 | A1* | 1/2003 | Narasimhamurthy | G06F 12/063 709/213 |
| 2003/0135685 | A1* | 7/2003 | Cowan | G06F 13/4027 710/308 |
| 2005/0114555 | A1* | 5/2005 | Errickson | G06F 12/1475 711/E12.095 |
| 2005/0114623 | A1* | 5/2005 | Craddock | G06F 9/3004 712/E9.032 |
| 2006/0294261 | A1* | 12/2006 | Nordstrom | G06F 12/0653 710/3 |
| 2011/0252174 | A1* | 10/2011 | Armstrong | G06F 12/0292 711/E12.001 |
| 2011/0276779 | A1* | 11/2011 | Engebretsen | G06F 13/4022 711/209 |

OTHER PUBLICATIONS

Sharwood, "Microsoft offloads networking to FPGA-powered NICs", The Register (online), Jan. 8, 2018, 5 pages, https://www.theregister.co.uk/2018/01/08/azure_fpga_nics/.

* cited by examiner

*Primary Examiner* — Titus Wong (57) ABSTRACT

Shared memory workloads using existing network fabrics, including: presenting, by a Memory Mapped Input/Output (MMIO) translator, memory of the MMIO translator as a portion of a memory space of a host; receiving, by the MMIO translator, a first interrupt from an input/output (I/O) adapter; and storing, by the MMIO translator, without sending the first interrupt to an operating system, data associated with the first interrupt from the I/O adapter into the memory of the MMIO translator.

20 Claims, 5 Drawing Sheets

SHARED MEMORY WORKLOADS USING EXISTING NETWORK FABRICS

BACKGROUND

Field of the Invention

The field of the invention is data processing, or, more specifically, methods, apparatus, and systems for shared memory workloads using existing network fabrics.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Shared memory workloads using existing network fabrics, including: presenting, by a Memory Mapped Input/Output (MMIO) translator, memory of the MMIO translator as a portion of a memory space of a host; receiving, by the MMIO translator, a first interrupt from an input/output (I/O) adapter; and storing, by the MMIO translator, without sending the first interrupt to an operating system, data associated with the first interrupt from the I/O adapter into the memory of the MMIO translator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
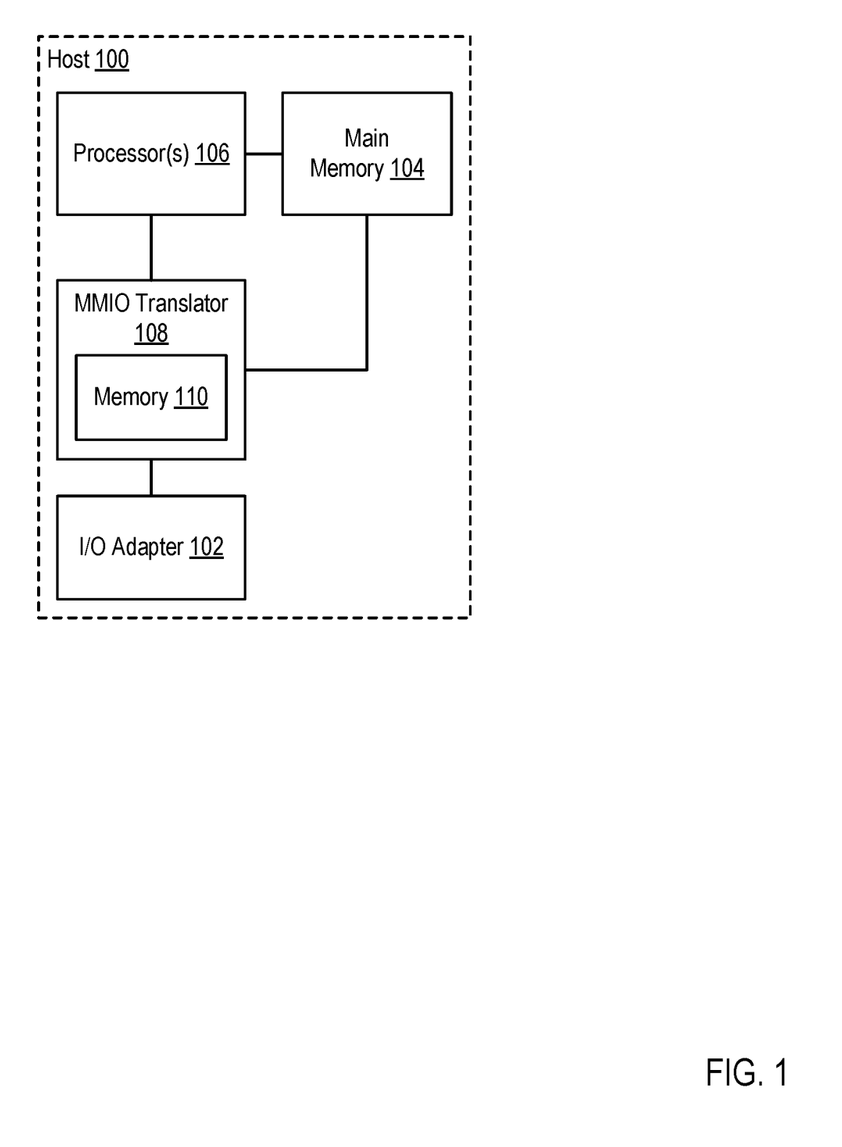
FIG. 1 shows a block diagram of an example host for shared memory workloads using existing network fabrics according to some embodiments of the present disclosure.

Exemplary methods, apparatus, and systems for shared memory workloads using existing network fabrics in accordance with the present invention are described with reference to the accompanying drawings, beginning with FIG. 1. FIG. 1 sets forth a block diagram of a host 100 configured for shared memory workloads using existing network fabrics according to embodiments of the present invention. The host 100 may include a computing device such as a server in a networked computing environment, a node in a distributed computing environment, or other host 100 as can be appreciated. The host 100 of FIG. 1 includes an Input/Output (I/O) adapter 102 that receives input from external devices and/or provides output to external devices. The I/O adapter 102 may include a network adapter (e.g., an Ethernet adapter or other wired or wireless network adapter). The I/O adapter 102 may use a variety of connections or couplings to the host 100 (e.g., to a motherboard of the host 100), such as Peripheral Component Interconnect express (PCIe). Particularly, the I/O adapter 102 is configured to provide received data (e.g., data received via a network) to an operating system and/or software executed on the host 100 using Memory Mapped Input/Output (MMIO).

In existing implementations of performing I/O using MMIO, an operating system of the host 100 allocates a buffer in main memory 104 (e.g., Random Access Memory or other on-board memory accessible to processors 106). When a datum is available on the physical layer, the I/O adapter 102 provides an interrupt to the operating system and stores the datum in the buffer of main memory 104 (e.g., using Direct Memory Access (DMA)). The processors 106 then handle the interrupt by acting on the data stored in the buffer of main memory 104. Latency results from an interrupt being generated for each datum received by the I/O adapter 102. Although other technologies for I/O adapters may reduce latency, they may rely on specialized processors 106 or architectures, and may also require new network fabrics to be installed.

Instead, an MMIO translator 108 is installed in the host 100. The MMIO translator 108 is a hardware component installed within a same coherency space as the main memory 104. For example, the MMIO translator 108 and main memory 104 may share a same bus, or are otherwise in the same coherency space, depending on which processor 106 architecture is used. The MMIO translator 108 includes onboard memory 110 (e.g., Random Access Memory (RAM), Double Data Rate Random Access Memory (DDR RAM), etc.). The MMIO translator 108 presents its memory 110 in a same memory space as the main memory 104. Presenting memory 110 in the same memory space as the main memory 104 includes presenting the memory 110 as being logically contiguous and therefore forming a same space with respect to the main memory 104. Thus, from the perspective of the operating system and/or other components, the main memory 104 has been expanded to include the presented memory 110 of the MMIO translator 108. The memory 110 of the MMIO translator 108 can then be accessed (e.g., read from or written to) as if accessing main memory 104.

Presenting memory 110 in the same memory space as the main memory 104 may include signaling the operating system to allocate a buffer in the memory 110 for use in MMIO transactions from the I/O adapter 102. The operating system may then indicate a memory address or range for the buffer to the I/O adapter 102. The I/O adapter 102 can then perform MMIO transactions by writing to the identified buffer. However, instead of writing to main memory 104, the I/O adapter 102 would instead be writing to the memory 110 of the MMIO translator that is presented as being in the same memory space as the main memory 104.

The MMIO translator 108 receives a first interrupt from the I/O adapter 102. For example, in response to data being available on the physical layer via the I/O adapter 102, the I/O adapter 102 generates the first interrupt for sending to the operating system. The MMIO translator 108 receives (e.g., intercepts) the first interrupt instead of the first interrupt being sent to the operating system. For example, the MMIO translator 108 may be installed on a same bus as used by the I/O adapter 102 to send interrupts.

The MMIO translator 108 then stores, without sending the first interrupt to the operating system, data associated with the first interrupt from the I/O adapter into the memory 110 of the MMIO translator 108. For example, the MMIO translator 108 and the I/O adapter 102 perform an MMIO transaction (e.g., using DMA) to store the data from the I/O adapter 102 to the memory 110 of the MMIO translator 108. Thus, data is received via the I/O adapter 102 without the operating system receiving an interrupt (e.g., the first interrupt).

The data from the I/O adapter 102 may be stored as a portion of a corpus of data stored in the memory 110 of the MMIO translator 108. For example, assume that multiple portions of data are received via the I/O adapter 102. Each portion may be related to a single task or process. For example, assume the host 100 is part of a distributed computing system calculating a large matrix processing problem, and one or more other hosts 100 are sending data related to their allocated task to the host 100 via the I/O adapter 102. The MMIO translator 108 may store each portion of the received data in the corpus of data stored in memory 110, preventing multiple interrupts from being raised. Thus, latency is reduced due to the reduced number of raised interrupts. Moreover, this approach allows for existing MMIO I/O adapters 102 and corresponding network fabrics to be used, allowing for reduced latency without requiring new network fabrics, I/O adapters, or specialized processors.

The MMIO translator 108 may then provide a second interrupt to the operating system of the host 100 to access the corpus of data. For example, the MMIO translator 108 may provide the second interrupt in response to contextually determining that a distributed task associated with the corpus of data has been completed. The contextual determination may be based on a signal or indication from a remote node that the task is completed and that the entire corpus of data has been transferred. The contextual determination may also be made by an application explicitly invoking an interrupt of the operating system instead of the MMIO translator. The contextual determination may also be made based on a state of the corpus of data (e.g., the corpus of data meets a size threshold or matches one or more predefined attributes). The operating system then accesses the corpus of data. For example, the operating system accesses the corpus of data directly from the memory 110 of the MMIO adapter 102. As another example, the MMIO adapter moves the corpus of data to main memory 104 (e.g., using DMA), and the operating system accesses the corpus of data from the main memory 104.

Figure 2:
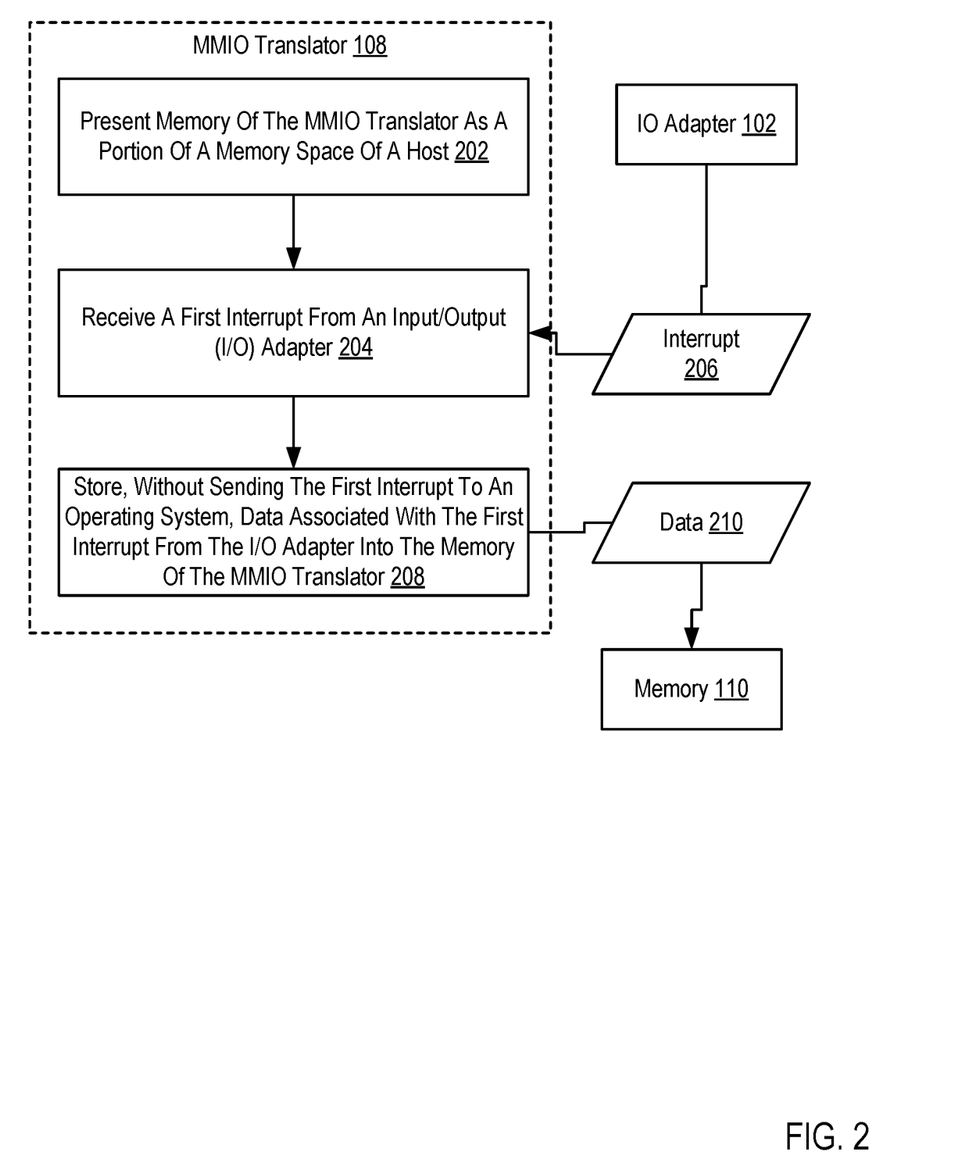
FIG. 2 is a flowchart of an example method for shared memory workloads using existing network fabrics according to some embodiments of the present disclosure.

For further explanation, FIG. 2 sets forth a flow chart illustrating an exemplary method for shared memory workloads using existing network fabrics according to embodiments of the present invention that includes presenting 202 (e.g., by an MMIO translator 108) memory 110 of the MMIO translator 108 as a portion of a memory space of a host 100 (e.g., in a same memory space as the main memory 104 of the host 100). Presenting memory 110 of the MMIO translator 108 as a portion of a memory space of a host 100 includes presenting the memory 110 as being logically contiguous and therefore forming a same space with respect to the main memory 104. Thus, from the perspective of the operating system and/or other components, the main memory 104 has been expanded to include the presented memory 110 of the MMIO translator 108. The memory 110 of the MMIO translator 108 can then be accessed (e.g., read from or written to) as if accessing main memory 104.

Presenting memory 110 of the MMIO translator 108 as a portion of a memory space of a host 100 may include signaling the operating system to allocate a buffer in the memory 110 for use in MMIO transactions from the I/O adapter 102. The operating system may then indicate a memory address or range for the buffer to the I/O adapter 102. The I/O adapter 102 can then perform MMIO transactions by writing to the identified buffer. However, instead of writing to main memory 104, the I/O adapter 102 would instead be writing to the memory 110 of the MMIO translator that is presented as being in the same memory space as the main memory 104.

The method of FIG. 2 also includes receiving 204 (e.g., by the MMIO translator 108) a first interrupt 206 from the I/O adapter 102. For example, in response to data being available on the physical layer via the I/O adapter 102, the I/O adapter 102 generates the first interrupt 206. The MMIO translator 108 receives 204 (e.g., intercepts) the first interrupt 206 instead of the first interrupt 206 being sent to the operating system. For example, the MMIO translator 108 may be installed on a same bus as used by the I/O adapter 102 to send interrupts.

The method of FIG. 2 also includes storing 208 (e.g., by the MMIO translator 108 and/or the I/O adapter 102), without sending the first interrupt 206 to the operating system, data 210 associated with the first interrupt from the I/O adapter into the memory 110 of the MMIO translator 108. For example, the MMIO translator 108 and the I/O adapter 102 may perform an MMIO transaction (e.g., using DMA) to store the data 210 from the I/O adapter 102 to the memory 110 of the MMIO translator 108. The MMIO transaction may include a write to the buffer in the memory 110 of the MMIO adapter 108 allocated by the operating system and indicated to the I/O adapter 102. Thus, data 210 is received via the I/O adapter 102 without the operating system receiving an interrupt (e.g., the first interrupt).

Figure 3:
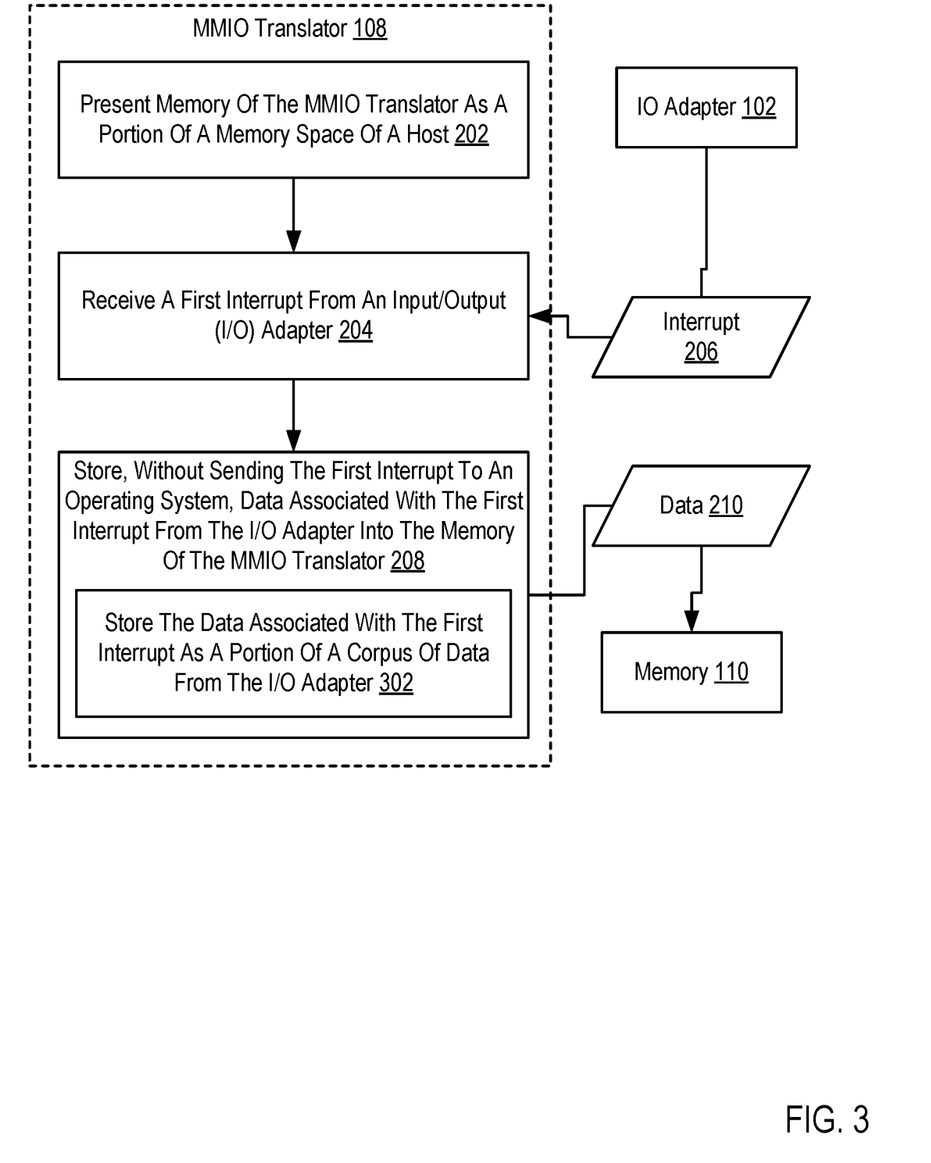
FIG. 3 is a flowchart of an example method for shared memory workloads using existing network fabrics according to some embodiments of the present disclosure.

For further explanation, FIG. 3 sets forth a flow chart illustrating an exemplary method for shared memory workloads using existing network fabrics according to embodiments of the present invention that includes presenting 202 (e.g., by an MMIO translator 108) memory 110 of the MMIO translator 108 as a portion of a memory space of a host 100 (e.g., in a same memory space as the main memory 104 of the host 100); receiving 204 a first interrupt 206 from an IO adapter 102; and storing 208, without sending the first interrupt 206 to the operating system, data associated with the first interrupt from the I/O adapter into the memory 110 of the MMIO translator 108.

The method of FIG. 3 differs from FIG. 2 in that storing 208, without sending the first interrupt 206 to the operating system, data associated with the first interrupt from the I/O adapter into the memory 110 of the MMIO translator 108 also includes storing 302 the data 210 associated with the first interrupt 206 as a portion of a corpus of data from the I/O adapter 102 (e.g., a corpus of data stored in the memory 110 of the MMIO translator 108). For example, assume that multiple portions of data are received via the I/O adapter 102. Each portion may be related to a single task or process. For example, assume the host 100 is part of a distributed computing system calculating a large matrix processing problem, and one or more other hosts 100 are sending data related to their allocated task to the host 100 via the I/O adapter 102. The MMIO translator 108 may store each portion of the received data in the corpus of data stored in memory 110, preventing multiple interrupts from being raised.

Figure 4:
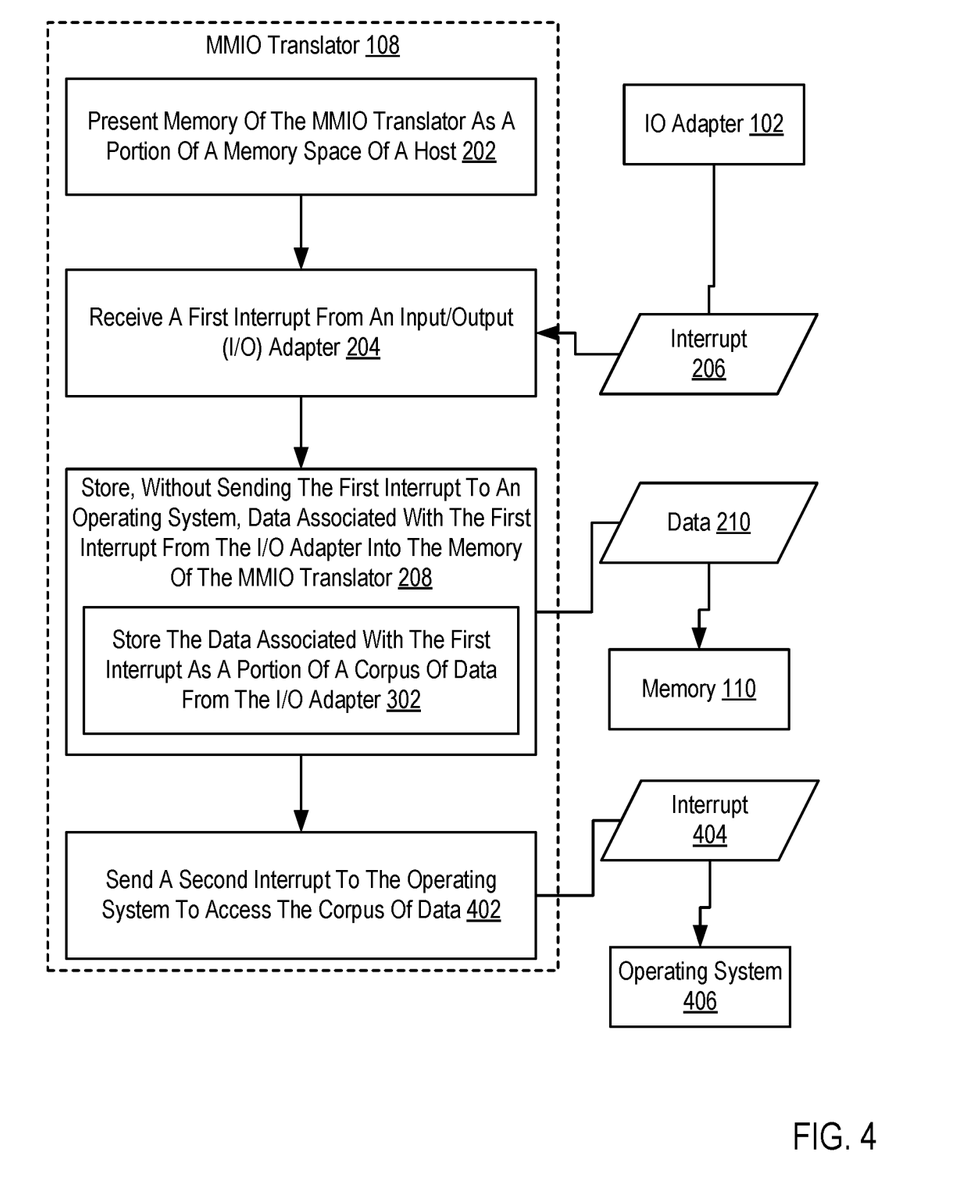
FIG. 4 is a flowchart of an example method for shared memory workloads using existing network fabrics according to some embodiments of the present disclosure.

For further explanation, FIG. 4 sets forth a flow chart illustrating an exemplary method for shared memory workloads using existing network fabrics according to embodiments of the present invention that includes presenting 202 (e.g., by an MMIO translator 108) memory 110 of the MMIO translator 108 as a portion of a memory space of a host 100 (e.g., in a same memory space as the main memory 104 of the host 100); receiving 204 a first interrupt 206 from an IO adapter 102; and storing 208, without sending the first interrupt 206 to the operating system, data associated with the first interrupt from the I/O adapter into the memory 110 of the MMIO translator 108 by storing 302 the data 210 associated with the first interrupt 206 as a portion of a corpus of data from the I/O adapter 102 (e.g., a corpus of data stored in the memory 110 of the MMIO translator 108).

The method of FIG. 4 differs from FIG. 3 in that the method of FIG. 4 also includes sending 402 (e.g., by the MMIO translator 108) a second interrupt 404 to the operating system 406 of the host 100 to access the corpus of data. The operating system 406, in response to the second interrupt 404, accesses the corpus of data. The operating system 406 can access the corpus of data directly from the memory 110 of the MMIO adapter 102 by initiating a read from the allocated buffer. The operating system 406 can also access the corpus of data from main memory 104 after the MMIO adapter 108 moves the corpus of data from its memory 110 to main memory 104 (e.g., using DMA).

Figure 5:
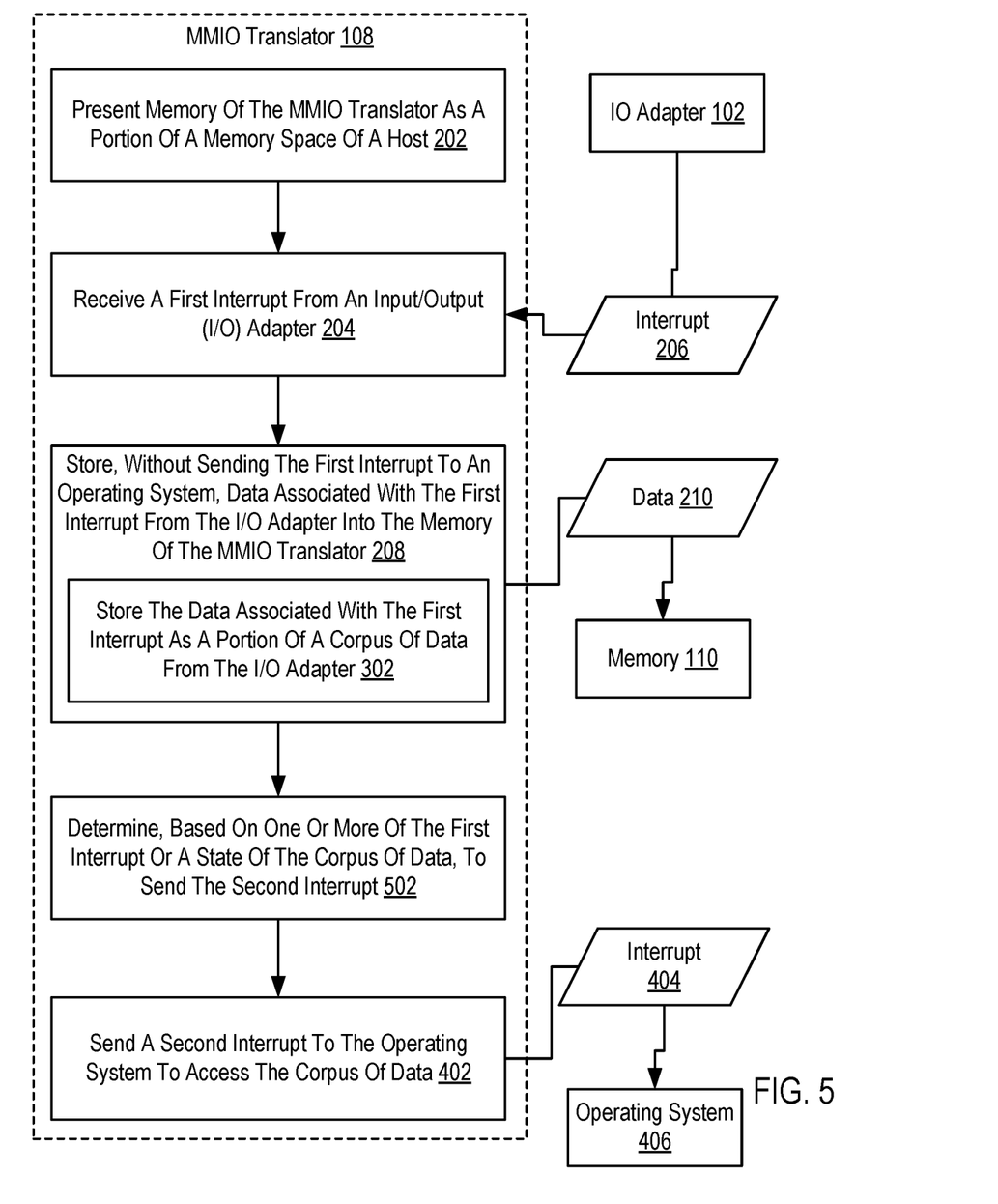
FIG. 5 is a flowchart of an example method for shared memory workloads using existing network fabrics according to some embodiments of the present disclosure.

For further explanation, FIG. 5 sets forth a flow chart illustrating an exemplary method for shared memory workloads using existing network fabrics according to embodiments of the present invention that includes presenting 202 (e.g., by an MMIO translator 108) memory 110 of the MMIO translator 108 as a portion of a memory space of a host 100 (e.g., in a same memory space as the main memory 104 of the host 100); receiving 204 a first interrupt 206 from an IO adapter 102; and storing 208, without sending the first interrupt 206 to the operating system, data associated with the first interrupt from the I/O adapter into the memory 110 of the MMIO translator 108 by storing 302 the data 210 associated with the first interrupt 206 as a portion of a corpus of data from the I/O adapter 102 (e.g., a corpus of data stored in the memory 110 of the MMIO translator 108); and sending 402 a second interrupt 404 to the operating system 406 of the host 100 to access the corpus of data.

The method of FIG. 5 differs from FIG. 4 in that the method of FIG. 5 also includes determining 502 (e.g., by the MMIO translator 108), based on one or more of the first interrupt 206 or a state of the corpus of data, to send the second interrupt 404. For example, the MMIO translator 108 may send the second interrupt 404 in response to contextually determining that a distributed task associated with the corpus of data has been completed. The contextual determination may be based on a signal or indication from a remote node that the task is completed and that the entire corpus of data has been transferred. Such an indication may then be reflected or otherwise indicated in the first interrupt 206. The contextual determination may also be made by an application explicitly invoking an interrupt of the operating system instead of the MMIO translator, thereby being reflected in the first interrupt 206. The contextual determination may also be made based on a state of the corpus of data (e.g., the corpus of data meets a size threshold or matches one or more predefined attributes).

In view of the explanations set forth above, readers will recognize that the benefits of shared memory workloads using existing network fabrics according to embodiments of the present invention include:

Improved performance of a computing system by reducing latency caused by interrupts generated in response to I/O operations.

Improved performance of a computing system by allowing for reduced latency using legacy network fabrics and I/O adapters, eliminating the need for updated processors or network fabrics.

Exemplary embodiments of the present invention are described largely in the context of a fully functional computer system for shared memory workloads using existing network fabrics. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of shared memory workloads, the method comprising:
   presenting, by a Memory Mapped Input/Output (MMIO) translator, memory of the MMIO translator as a portion of a memory space of a host, wherein the memory of the MMIO translator comprises an MMIO address range;
   receiving, by the MMIO translator, a first interrupt from an input/output (I/O) adapter; and
   storing, by the MMIO translator, without sending the first interrupt to an operating system, data associated with the first interrupt from the I/O adapter into the MMIO address range in the memory of the MMIO translator.

2. The method of claim 1, wherein storing the data associated with the first interrupt from the I/O adapter comprises storing the data associated with the first interrupt as a portion of a corpus of data from the I/O adapter, wherein the first interrupt was sent by the I/O adapter for the operating system, and wherein receiving, by the MMIO translator, the first interrupt from the I/O adapter comprising intercepting, by the MMIO translator, the first interrupt.

3. The method of claim 2, further comprising sending a second interrupt to the operating system to access the corpus of data.

4. The method of claim 3, further comprising determining, based on one or more of the first interrupt or a state of the corpus of data, to send the second interrupt.

5. The method of claim 1, wherein the memory space of the host comprises one or more memory modules in a same coherency space as the memory of the MMIO translator.

6. The method of claim 1, wherein the data associated with the first interrupt is stored into the memory of the MMIO translator using Direct Memory Access.

7. The method of claim 1, wherein the I/O adapter comprises one or more of a network adapter or a Peripheral Component Interconnect express (PCIe) adapter.

8. An apparatus for shared memory workloads configured to perform steps comprising:
  presenting, by a Memory Mapped Input/Output (MMIO) translator, memory of the MMIO translator as a portion of a memory space of a host, wherein the memory of the MMIO translator comprises an MMIO address range;
  receiving, by the MMIO translator, a first interrupt from an input/output (I/O) adapter; and
  storing, by the MMIO translator, without sending the first interrupt to an operating system, data associated with the first interrupt from the I/O adapter into the MMIO address range in the memory of the MMIO translator.

9. The apparatus of claim 8, wherein storing the data associated with the first interrupt from the I/O adapter comprises storing the data associated with the first interrupt as a portion of a corpus of data from the I/O adapter.

10. The apparatus of claim 9, wherein the steps further comprise sending a second interrupt to the operating system to access the corpus of data.

11. The apparatus of claim 10, wherein the steps further comprise determining, based on one or more of the first interrupt or a state of the corpus of data, to send the second interrupt.

12. The apparatus of claim 8, wherein the memory space of the host comprises one or more memory modules in a same coherency space as the memory of the MMIO translator.

13. The apparatus of claim 8, wherein the data associated with the first interrupt is stored into the memory of the MMIO translator using Direct Memory Access.

14. The apparatus of claim 8, wherein the I/O adapter comprises one or more of a network adapter or a Peripheral Component Interconnect express (PCIe) adapter.

15. A system for shared memory workloads comprising:
  a processor;
  an Input/Output (I/O) Adapter; and
  a Memory Mapped Input/Output (MMIO) translator configured to perform steps comprising:
    presenting, by the MMIO translator, memory of the MMIO translator as a portion of a memory space of a host, wherein the memory of the MMIO translator comprises an MMIO address range;
    receiving, by the MMIO translator, a first interrupt from the I/O adapter; and
    storing, by the MMIO translator, without sending the first interrupt to an operating system, data associated with the first interrupt from the I/O adapter into the MMIO address range in the memory of the MMIO translator.

16. The system of claim 15, wherein storing the data associated with the first interrupt from the I/O adapter comprises storing the data associated with the first interrupt as a portion of a corpus of data from the I/O adapter.

17. The system of claim 16, wherein the steps further comprise sending a second interrupt to the operating system to access the corpus of data.

18. The system of claim 17, wherein the steps further comprise determining, based on one or more of the first interrupt or a state of the corpus of data, to send the second interrupt.

19. The system of claim 15, wherein the memory space of the host comprises one or more memory modules in a same coherency space as the memory of the MMIO translator.

20. The system of claim 15, wherein the data associated with the first interrupt is stored into the memory of the MMIO translator using Direct Memory Access.

* * * * *